United States Patent [19]

Martinez

[11] 4,436,462
[45] Mar. 13, 1984

[54] MULTI-STOP DEPTH CONTROL

[76] Inventor: Rafael Martinez, 101 Monroe St., Garfield, N.J. 07026

[21] Appl. No.: 341,164

[22] Filed: Jan. 21, 1982

[51] Int. Cl.³ .......................... B23B 49/00; B23C 1/06
[52] U.S. Cl. ...................................... 409/218; 408/14; 408/16
[58] Field of Search ...................... 409/218; 408/14, 16

[56] References Cited

U.S. PATENT DOCUMENTS

| 2,110,537 | 3/1938 | Tautz | 408/16 |
| 2,318,691 | 5/1943 | Huthsing | 408/16 |
| 3,082,650 | 3/1963 | Young | 408/16 |
| 3,435,730 | 4/1969 | Berberian | 408/16 X |
| 3,589,219 | 6/1971 | Parsons | 408/14 X |
| 3,724,964 | 4/1973 | Needham, Jr. | 408/14 |

FOREIGN PATENT DOCUMENTS 772817 10/1980 U.S.S.R. ................................ 409/218

Primary Examiner—Francis S. Husar
Assistant Examiner—Steven B. Katz
Attorney, Agent, or Firm—McGlew and Tuttle

[57] ABSTRACT

A multi-stop depth control for a milling machine is disclosed which includes a fixed member connected to the milling machine frame having a rotatable wheel mounted thereon. The wheel carries a plurality of stop posts each with a stop member. Each stop is engageable with a through bore of a movable part of the milling machine which is connected to the movable quill thereof. By rotating a selected one of the posts into alignment with the movable part of the milling machine a selected depth of movement for the movable part of the milling machine is established.

7 Claims, 2 Drawing Figures

MULTI-STOP DEPTH CONTROL

FIELD AND BACKGROUND OF THE INVENTION

The present invention relates in general to depth controls for milling machines and the like, and in particular to a new and useful multi-stop depth control which conveniently sets a plurality of depths of cut for a milling machine.

Multi-position depth setting stop arrangements are known for drill presses, milling machines and the like. One such arrangement is disclosed in U.S. Pat. No. 3,724,964 to Needham, Jr. This arrangement utilizes a rotatable collar which carries a plurality of bolts one of which is positionable to abut a stop surface of the drill press or milling machine. The collar with bolts is mounted on the carriage which carries the rotating tool carrying shaft. The movable carriage is thus unnecessarily increased in weight. This weight also is necessarily applied off-center to the center of rotation of the tool carrying shaft which also may cause small amounts of bending in the shaft which may be particularly important in milling machines where exact alignment of the cutting tool is a necessity.

It is also known to provide retrofit equipment for milling machines particularly widely used milling machines such as the BRIDGEPORT milling machine. BRIDGEPORT is a registered trademark of the Bridgeport Machine Division of Textron, Inc. One example of such equipment is a quick change tool carrier for BRIDGEPORT milling machines disclosed in U.S. Pat. Nos. 4,059,066 and 4,128,043.

Such milling machines have also recently been equipped with computerized equipment for moving the milling machine table in the horizontal direction. The inclusion of a vertical control which operates on the quill, or rotary shaft carrying portion of the milling machine, substantially increase the cost of such controls. An example of such horizontal and vertical control arrangements is known under the trademark of DynaPath System 10 of the Bendix Corporation. DynaPath is a registered trademark of the Bendix Corporation.

It would thus be advantageous to provide a multi-stop control arrangement for the vertical axis of a milling machine.

SUMMARY OF THE INVENTION

Accordingly an object of the present invention is to provide a multi-stop depth control for controlling the stopping position of a milling machine quill as it descends on a vertical path which can easily be adapted to known and widely used milling machines in a simple and economic manner.

Another object of the invention is to provide such a depth control which is simple in design, rugged in construction and economical to manufacture.

A further object of the invention is to provide a multi-stop depth control for a milling machine which includes a base member that is firmly mounted to a stationary part of the milling machine, a set wheel which is rotatably mounted to the base position, stop means for firmly positioning the wheel with respect to the base member at a plurality of locations, a plurality of posts extending from the wheel each alignable in one of the wheel fixed positions with a post receiving member of a vertically movable quill of the milling machine, and stop means selectively positionable at various vertical positions on each post and engageable with the post receiving member of the quill for stopping the descent of the quill.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is disclosed.

DETAILED DESCRIPTION OF THE PREFERRED EMBODIMENT

Figure 1:
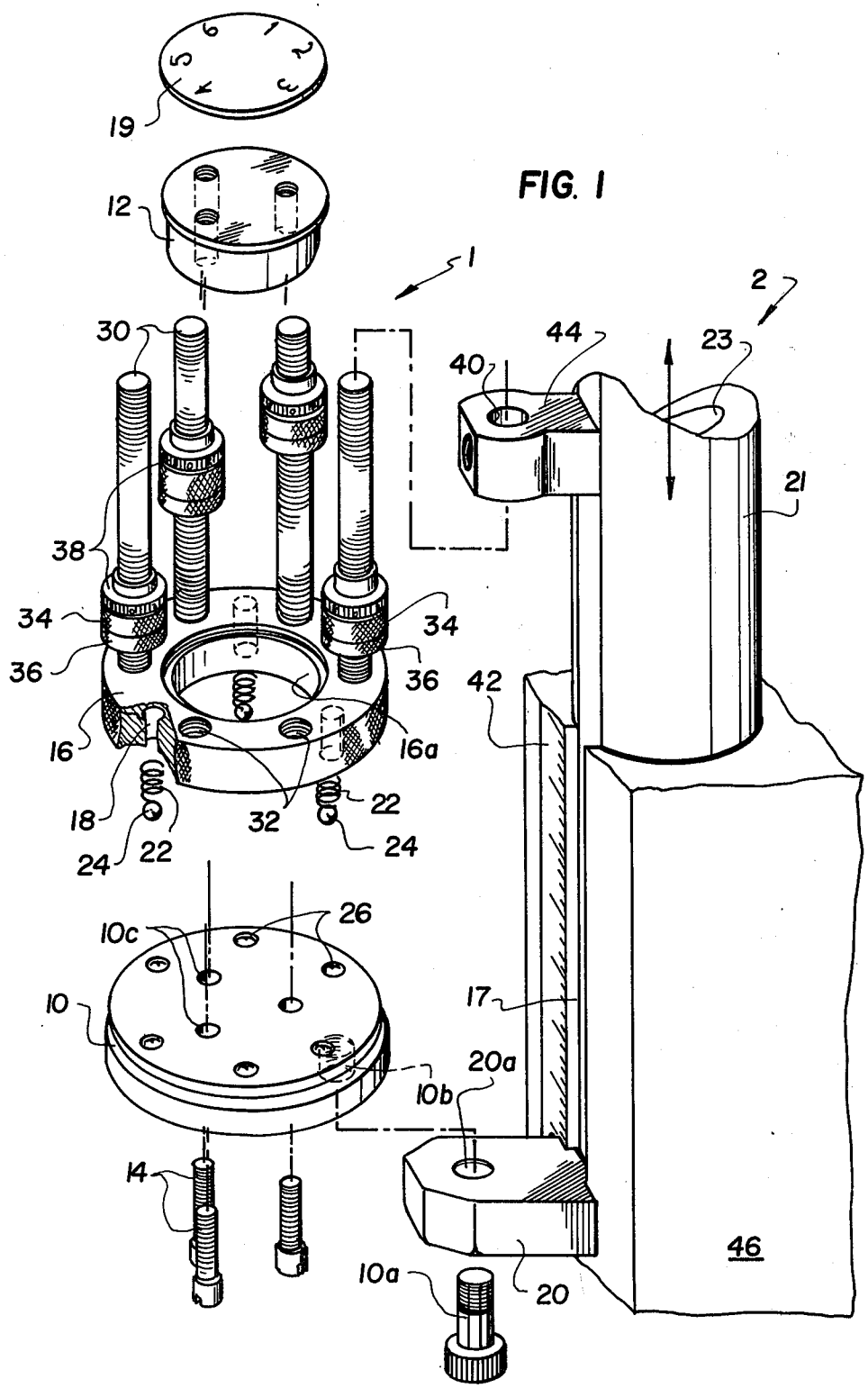
FIG. 1 is an exploded perspective view showing the various parts of the invention and their association with a fixed and movable portion of a milling machine.
Figure 2:
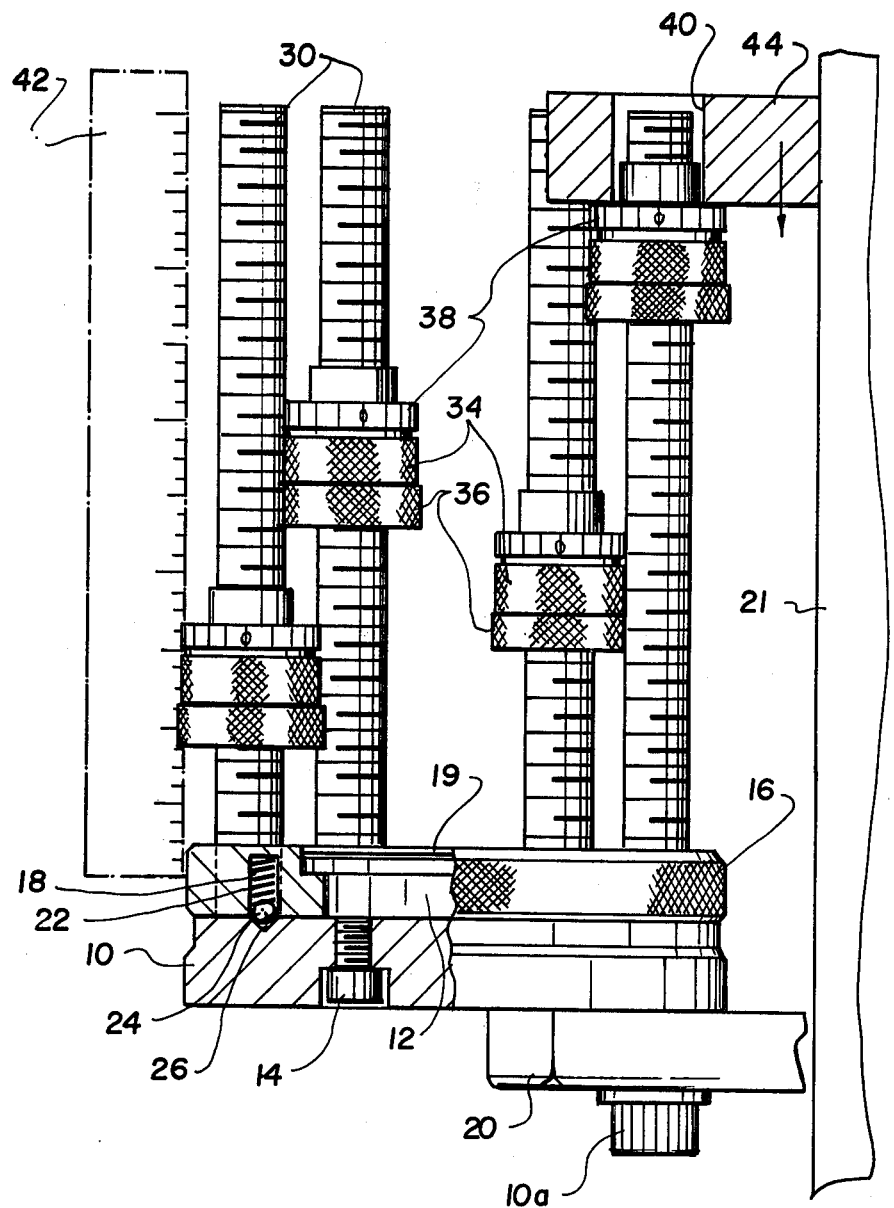
FIG. 2 is a side elevational view partially in section of the apparatus shown in FIG. 1.

Referring to the drawings in particular, the invention embodied therein in FIGS. 1 and 2 comprises a multi-stop depth control generally designated 1 for a milling machine generally designated 2.

As is known, the milling machine includes a fixed quill frame 46 which carries a fixed platform 20 having an aperture 20a therein. Milling machine 2 also includes quill 21 which moves vertically in the direction of the double arrow and which carries in an opening 23, a rotating cutting tool carrying shaft (not shown). Quill 21 includes a stop shaft receiving projection 44 with a through bore 40 therein for receiving one of a plurality of stop shafts 30 which will be described later. Platform 20 is vertically aligned over projection 44 and bore 40 is substantially aligned over bore 20a, as shown in FIG. 1.

Machine frame 46 includes a slot 17 which accommodates projection 44 as it moves with quill 21 in the vertical direction. Milling machine 2 is also provided with a scale 42 which in the embodiment shown is connected to the frame 46. According to the invention, a base member 10 is fixed to stationary platform or part 20 by a bolt 10a extending through aperture 20a and threaded into threaded bore 10b of base member 10. Base member 10 also includes a plurality of position stop recesses 26. Six of these recesses are shown in the embodiment of the invention of FIG. 1.

A position set wheel 16 is rotatably mounted on base member 10 by a retaining post 12 which extends through opening 16a of wheel 16 and is bolted to base member 10 by bolts 14 which extend through openings 10c of base member 10. A position indication cap 19 is fixed to position set wheel 16 and rotates therewith to indicate the relative position between wheel 16 and milling machine frame 46.

Wheel 16 is provided at its lower surface with three blind bores 18 which each receive a spring 22 and position setting ball 24. Six firmly held positions can thus be established between wheel 16 and frame 46.

Wheel 16 is provided with a plurality of stop shafts or rods 30 which are threaded in the embodiment shown and six in number. At each position of set wheel 16, one rod 30 is brought into alignment with through bore 40. Each threaded shaft 30 is equipped with a threadably received stop nut 34 which has an integrally connected vernier 38. Any selected position can be chosen for nut 34 on its associated threaded shaft 30 by rotating the nut. The nut is then locked in position by a lock nut 36 also threaded to each respective shaft 30.

In operation a plurality of desired depths of cut for the milling machine can be set on the plurality of rods 30 by moving the set wheel so that one rod at a time is brought into association with scale 42 and thereafter rotating the associated nut 34 with vernier 38 until it exactly matches the depth desired on scale 42. In known fashion this scale is augmented by the vernier 38 which for example shows thousandths of an inch. FIG. 2 shows a phantom representation of scale 42 in association with one of the verniers 38 on its associated nut 34. FIG. 2 also shows projection 44 engaged with the top surface of another vernier plus nut combination, which sets the lower permitted position for quill 21 connected to projection 44.

It is noted that the rod 30 which is engaged by projection 44 is that one which is vertically aligned between platform 20 and projection 44.

The cap 19 is utilized to identify each threaded rod 30 so that the proper depth can be set in a quick and reliable manner.

To facilitate easy retrofitting of the inventive device on standard milling machines such as the above-identified BRIDGEPORT milling machine, the aperture 20a of platform 20 may be the same as that which normally accommodates a single threaded depth setting shaft available with such machines.

Each threaded rod 30 is threaded into a suitably provided threaded bore 32 of wheel 16. FIG. 1 shows two of these threaded bores empty for clarity.

The invention is advantageous not only in that it can be positioned in a simple and reliable manner on known milling machines but also in that the entire equipment is mounted to a fixed portion of the milling machine rather than a movable quill portion so that the quill is relieved of any extra weight which may affect the wear and accuracy of the milling machine.

While a preferred embodiment of the invention has been shown and described in detail to illustrate the application of the principles if the invention, it will be understood that the invention may be embodied otherwise without departing from such principles.

What is claimed is:

1. A multi-stop depth control in combination with a milling machine having a quill frame, a fixed platform extending from the frame, a quill movable in a vertical direction in the frame having a projection extending beyond the frame with a through bore therein and a scale for indicating vertical distance, comprising:
    a base member fixed to the milling machine platform, the platform being vertically aligned with and below the projection;
    a set wheel rotatably mounted to said base member;
    position setting means connected between said wheel and said base member for establishing a plurality of firm rotary positions between said wheel and the milling machine frame;
    a plurality of rods circumferentially spaced and extending upwardly from a top surface of said wheel each engageable with the quill projection through bore in one of said plurality of rotary positions when each rod is vertically aligned between the platform and the projection;
    a vernier carrying element rotatably mounted on each rod and movable to any selected vertical position on each rod; and
    element locking means connected to each vernier carrying element for locking each vernier carrying element at a selected vertical position on each rod respectively;
    each vernier carrying element with respective rod movable into one of said plurality of said rotary positions to bring said vernier carrying element into close association with the milling machine scale for accurately setting the vertical position of each vernier carrying element on each respective rod;
    each vernier carrying element functioning as a stop for abutment with the milling machine quill projection for stopping a vertical descent of the milling machine quill.

2. A multi-stop depth control according to claim 1, wherein the quill frame has a slot therein extending upwardly from the platform, the projection being shaped for vertical movement in said slot and in vertical alignment with the platform, the platform having a through bore extending therethrough in substantial vertical alignment with the through bore of the projection, said base member being fixed to the platform by a bolt extending through said through bore of the platform.

3. A multi-stop depth control according to claim 2, wherein said position set means comprises a plurality of circumferentially spaced blind bores extending into a lower surface of said set wheel, a spring in each blind bore, a ball in each blind bore biased downwardly by each spring respectively, and a plurality of stop recesses circumferentially spaced on a top surface of said base member of a number at least equal to that of said blind bores for registration with each ball respectively to set said plurality of firm rotary positions.

4. A multi-stop depth control according to claim 2, wherein each rod is threaded, each vernier carrying element comprises a threaded nut threadably engaged with each rod respectively, said element lock means comprising a lock nut threadably engaged with each threaded rod and threadable into engagement with each nut respectively to lock the vertical position of each vernier carrying element.

5. A multi-stop depth control according to claim 4, wherein said set wheel includes a centrally positioned opening therethrough, a retaining post extending through said wheel opening and bolted to said base member for rotatably mounting said wheel to said base member.

6. A multi-stop depth control according to claim 5, including a rotary position indicating cap fixed to said wheel above said post having a number of indicia equal to a number of said rods on said wheel to indicate which of said rods is in one of said rotary positions in alignment with said milling machine projection through bore.

7. A multi-stop depth control according to claim 6, wherein each of said vernier carrying element nut, said lock nut and said set wheel are knurled to facilitate manual rotation thereof.

* * * * *